INVENTOR.
WINFRED LEE WILLIAMS
BY
Attorneys

Nov. 17, 1964
W. L. WILLIAMS
3,157,389
PLANT SETTING DEVICE
Filed Oct. 6, 1961
2 Sheets-Sheet 2
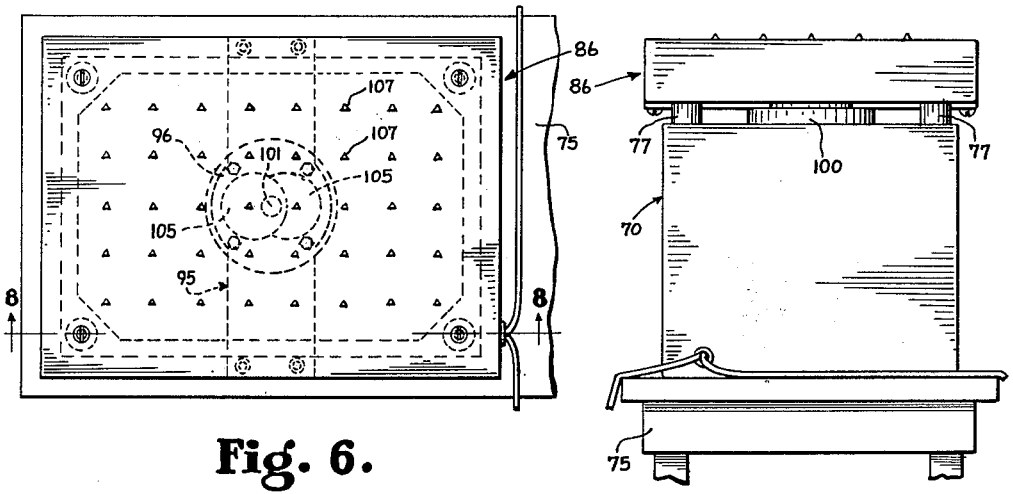
Fig. 6.
Fig. 7.
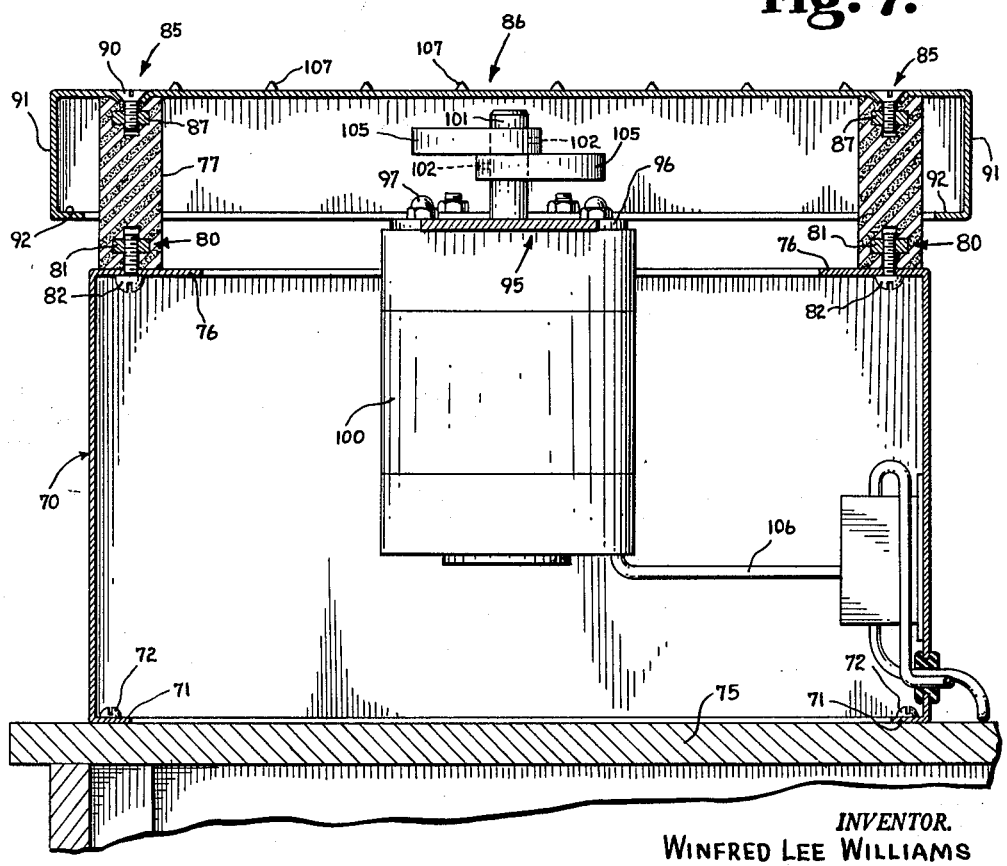
Fig. 8.
INVENTOR.
WINFRED LEE WILLIAMS
BY
Lockwood, Woodard, Smith & Weikart
Attorneys

3,157,389
PLANT SETTING DEVICE
Winfred Lee Williams, Rte. 2, Marshville, N.C.
Filed Oct. 6, 1961, Ser. No. 143,491
1 Claim. (Cl. 259—1)

The present invention relates to a plant-setting device and finds important utility in placing of soil about the roots of small plants received in peat pots or in flats.

It is almost universal practice to manually set plants in flats or the like by forming a hole in the dirt, placing the roots of the plant in the hole and then moving the soil back into the hole over the roots. It can be appreciated that such a method is slow and that as a result, the labor costs involved are relatively high. Furthermore, the manual forcing of soil down around the roots is apt to result in damage to the plant roots. Consequently, one object of the invention is to provide a plant-setting device which operates quickly and efficiently whereby labor costs are reduced.

A further object of the invention is to provide a plant-setting device which causes less injury to the plant roots in setting the plants.

Still another object of the invention is to provide a plant-setting device which is easy and convenient to use, is simple and inexpensive in construction, yet is durable and long-lasting.

Related objects and advantages will become apparent as the description proceeds.

One embodiment of the present invention includes a plant-setting device comprising a horizontal table having an opening therethrough. An elastic strip of rubber or the like is fixed to the table at the opening and is also fixed to a plate received within the opening so as to completely surround the plate and support it in approximate alignment with the surface of the table. There is also provided a bearing structure fixed to the plate and extended downwardly therefrom, said bearing structure rotatably mounting a shaft. Eccentric weights are adjustably fixed upon the shaft which is rotated by suitable means. Tension springs are attached at one end to said table so as to surround the bearing structure and extend radially inwardly to an attachment at the other end with said bearing structure.

The full nature of the invention will be understood from the accompanying drawings and the following description and claims.

FIG. 6 is a top plan view of an alternative embodiment of the invention.

FIG. 7 is a side elevation of the structure illustrated in FIG. 6.

FIG. 8 is a vertical section taken along the line 8—8 of FIG. 6 in the direction of the arrows.

Figure 1:
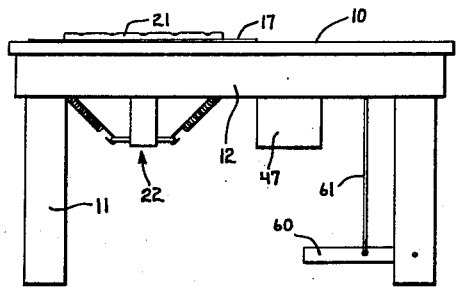
FIG. 1 is a side elevation of a plant-setting device constructed according to the present invention.
Figure 2:
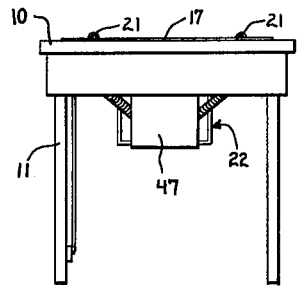
FIG. 2 is an elevation of the device of FIG. 1.
Figure 3:
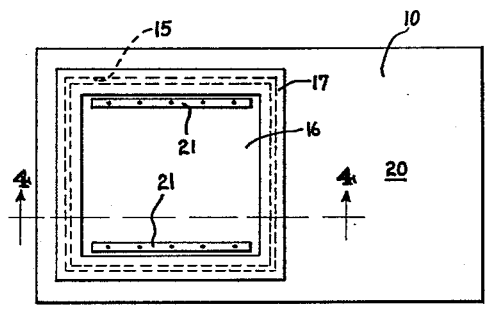
FIG. 3 is a top plan view of the structure of FIGS. 1 and 2.
Figure 5:
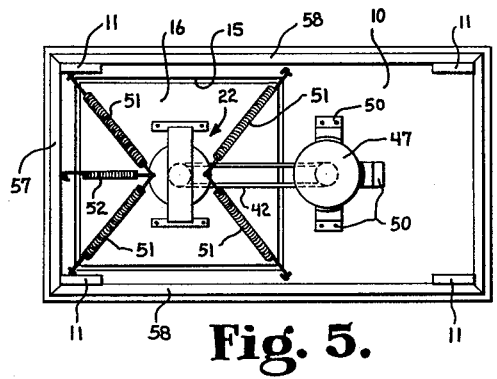
FIG. 5 is a bottom plan view of the structure of FIGS. 1-3.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a plant-setting device including a table 10 and suitable legs 11 fixed with relation to the table by means of table supporting structure 12. The table has formed therein a rectangular aperture or opening 15 within which is received rectangular plate 16, the plate being in approximate alignment with the surface of the table 10. An elastic strip of rubber or the like 17 is fixed to the plate 16 about the complete periphery thereof and is fixed to the table 10 about the complete periphery of the opening 15. It can be appreciated that the strip 17 holds the plate 16 in approximate alignment with the table 10 whereby a flat, resting upon the portion 20 of the table, may be easily transferred to the plate 16.

As will become apparent below, a flat is vibrated while it is resting upon the plate 16 in order to cause dirt to be shaken down around the roots of plants received with the flat. The portion 20 of the table may be used for forming holes in the dirt contained within the flat for reception of the plant roots. These holes may be formed in a regular uniform pattern by forcing down a board against the dirt, said board having a definite pattern of pegs or projections mounted thereon and designed to fit the particular flat involved. The dirt may be received directly within the flat or alternatively peat pots may be received within the flat whereby the respective plants are set within the peat pots.

The plate 16 is provided with a pair of parallel resilient elements 21, for example, two pieces of garden hose, fixed thereto. The resilient elements 21 are spaced apart (in their non-stressed condition) a distance slightly less than the width of the flat to be vibrated in order that the flat is resiliently held in position upon the plate 16 during vibration thereof.

Fixed to the bottom of the plate 16 is a bearing structure or assembly 22 which includes an upper portion 25 fixed to the bottom center of the plate 16 and also a U-shaped strap portion 26 and lower portion 27 all of which are integral or fixed with relation to one another. In the particular illustrated embodiment, the legs of the strap are fixed to the bottom of plate 16. Bearings 30 and 31 are fixed upon the upper and lower portions, respectively, and rotatably receive a shaft 32, which, as illustrated, projects perpendicularly downwardly from the plate 16.

A pair of eccentric weights 35 and 36 are adjustably fixed to the shaft 32 by means of set screws 37 and 40. It can be appreciated that the amount of eccentricity of the center of gravity of the total of weights 35 and 36 can be adjusted by rotating one or both of the weights upon the shaft and subsequent retightening of the set screws 37 and 40.

Also received upon the shaft 52 adjacent the upper end thereof is a pulley 41, said pulley being fixed to the shaft and receiving a belt 42 which also passes about a pulley 45 fixed to the drive shaft 46 of an electric motor 47. The motor 47 is mounted upon the lower surface of the table 10 by means of suitable brackets 50.

Four tension springs 51 are secured to the table on the underside thereof, each adjacent a respective corner of the rectangular aperture 15. The tension springs 51 extend downwardly and radially inwardly to the lower portion 27 of the bearing structure and are attached by means of suitable apertures in the portion 27. A further tension spring 52 is hooked at one end 55 to the bearing structure at approximately the same height as the pulley 41. The opposite end 56 of spring 52 is attached to a downwardly extending element 57 fixed to the table 10 and forming a part of the table supporting structure 12. It should be mentioned that the element 57 is braced against elements 58 and legs 11 and thus, will not be loosened by frequent flexing of the spring 52 (elements 58 being fixed to the table). The spring 52 extends from the bearing structure generally in an opposite direction from the belt 42 and thus, counteracts the tendency of the belt 42 to loosen as a result of the force thereof.

One example of the operation of the present device might include the forming of a plurality of holes within dirt in a flat by means of the above described board and peg arrangement. In performing this operation, the flat would be positioned on the portion 20 of the table. The flat is then transferred onto the plate 16 where the resilient elements 21 engage its opposite surfaces to maintain it in position on the plate. The motor 47 is then operated by downward movement of a foot pedal 60 connected by suitable linkage 61 to the electric switch of the motor. The shaft 32 is rotated by means of the belt and pulley arrangement 41, 42, and 45 causing rapid rotation of the eccentric weights and resulting in a vibration of the plate 16. It will be appreciated that the springs tend to maintain or return the plate 16 to its illustrated horizontal position while the off center rotation of the eccentric weights tends to vibrate the plate. The rubber strip 14 also acts to resiliently maintain the plate in the illustrated horizontal position.

Figure 4:
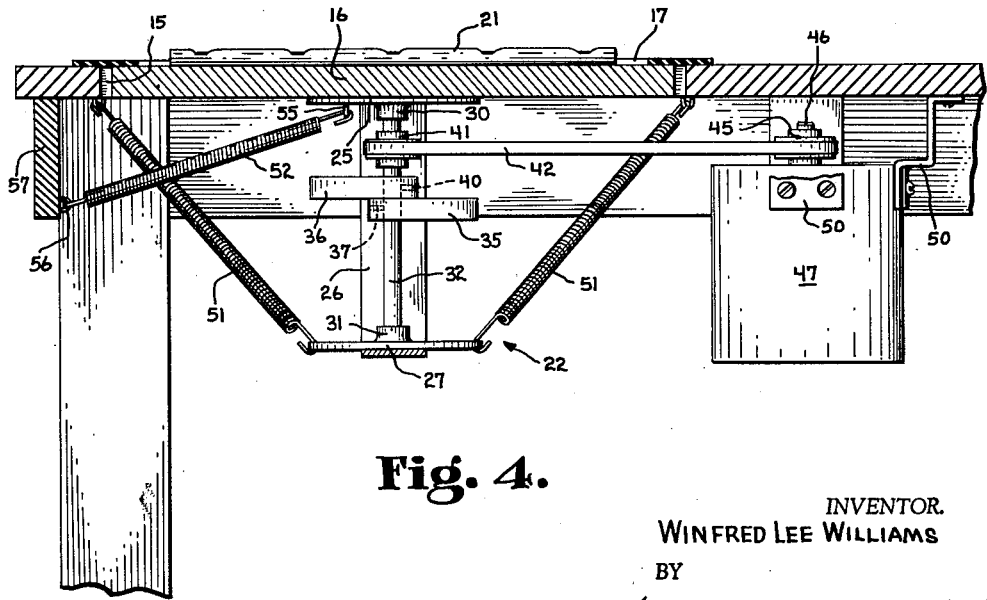
FIG. 4 is a vertical section taken along the line 4—4 of FIG. 3.

The spring 52 is arranged as illustrated and described in order to hold shaft 32 leftwardly (as illustrated in FIG. 4) so that the belt 42 is maintained in tight condition upon the pulleys 41 and 45. In other words, the spring 52 balances the force exerted by the belt 42 and insures that the belt constantly transmits the driving force from the motor to the shaft.

Referring to FIGS. 6–8, an alternative embodiment of the invention comprises a housing 70 having a rectangular shape and formed of sheet metal. The housing has inturned flanges 71 through which extend suitable screws 72 fixing the housing to a table 75. At the upper portion of the housing is formed an inturned flange 76 which extends around the complete upper periphery of the housing.

Four soft rubber cylinders 77 are fixed to the flange 76 by means of four bolts 80. These bolts include tapped metal nuts or grommets 81 molded into the rubber cylinders and four screws 82 extending through the flange 76 and tightly threaded into the nuts 81. Mounted upon the upper ends of the resilient members 77 by means of bolts 85 is a flat element 86. Similarly to the bolts 80, the bolts 85 comprise nuts 87 molded into the cylinder 77 and screws 90 extending through the flat element and tightly threaded within the nuts 87 whereby a resilient mounting of the flat element 86 upon the stationary housing 70 is provided.

The flat element 86 is provided with a downturned portion 91 and an inturned portion 92. Fixed to the inturned portion is a motor mounting plate 95 having an enlarged central portion 96. Fixed to the central portion by means of cap screws 97 is a preferably electric motor 100, the body of the motor hanging downwardly from the mounting plate 95. The drive shaft 101 of the motor extends upwardly through a suitable aperture in the mounting plate and has adjustably mounted thereon by means of set-screws 102, a pair of eccentric weights 105. The motor 100 is provided with suitable wiring 106 providing a connection to a suitable power supply and permitting operation by a conventional foot activated electric switch which may be positioned on the floor beneath the table.

From the description of the above embodiment, the operation of the present embodiment will be obvious.

A flat is placed upon the flat element 86 and is held in position by projections 107 which may be formed in the sheet metal making up the flat element by means of pinning, preferably with a three-cornered type punch to form a pattern of three closely spaced sharp projections on the top of the flat element whereby the plant-carrying flat is frictionally engaged. Operation of the motor 100 causes vibration of the flat element 86 as a result of the rotational movement of the eccentric weights 105 whereby the dirt in the flat is shaken down around the plant roots.

From the above description, it will be obvious that the present invention provides a plant-setting device which can simultaneously cover all the roots of plants in a flat and can perform this operation in a uniform manner. Thus, the worker need not manually move the dirt over each set of roots and man hours involved are greatly reduced. It has also been found that the present device results in much less injury to the plant roots than is normally sustained in hand setting at least partly because the operation upon each root is uniform.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A plant setting device comprising a stationary hollow housing having vertical sides and an inturned upper flange portion extending from the upper periphery of said housing, a plurality of rubber cylinders, a pair of internally threaded nuts molded into each of said rubber cylinders with the axes of said threads coaxial with the respective rubber cylinders, a horizontal flat element having a plurality of sharp projections extending upwardly therefrom said sharp projections being spaced in a regular pattern over the upper surface of said flat element and adapted to engage a wooden flat, screws extending through said flat element with each screw tightly threaded into one of the nuts of a respective rubber cylinder screws extending through said housing with each screw tightly threaded into the other nut of a respective rubber cylinder, said flat element having a downturned flange portion extending from the periphery of said flat element and an inturned flange portion extending from the lower edge of said downturned flange portion, a horizontal mounting plate secured to said inturned flange portion and extending from one side of said flat element to the other, a motor fixed to said mounting plate and projecting downwardly into said housing, said motor having an upwardly extending drive shaft terminating below said flat element, and eccentric weights adjustably fixed to said drive shaft.

References Cited in the file of this patent

UNITED STATES PATENTS

| 2,272,816 | Oyster | Feb. 10, 1942 |
| 2,817,127 | Beech | Dec. 24, 1957 |
| 2,840,923 | Behrens | July 1, 1958 |
| 2,269,283 | Krause | Jan. 20, 1959 |
| 2,882,024 | Behrens | Apr. 14, 1959 |
| 2,896,297 | Goossens | July 28, 1959 |

FOREIGN PATENTS

| 84,873 | Norway | Jan. 24, 1955 |